United States Patent
Jurrens et al.

(10) Patent No.: US 10,459,104 B2
(45) Date of Patent: Oct. 29, 2019

(54) METAL AMMUNITION DETECTION DEVICE

(71) Applicants: Lynn D. Jurrens, St. Michael, MN (US); William E. Lomax, Minneapolis, MN (US)

(72) Inventors: Lynn D. Jurrens, St. Michael, MN (US); William E. Lomax, Minneapolis, MN (US)

( * ) Notice: Subject to any disclaimer, the term of this patent is extended or adjusted under 35 U.S.C. 154(b) by 0 days.

(21) Appl. No.: 16/050,473

(22) Filed: Jul. 31, 2018

(65) Prior Publication Data

US 2019/0064381 A1 Feb. 28, 2019

Related U.S. Application Data

(60) Provisional application No. 62/539,638, filed on Aug. 1, 2017.

(51) Int. Cl.
*G01V 3/08* (2006.01)
*A47J 47/00* (2006.01)
*G08B 7/06* (2006.01)

(52) U.S. Cl.
CPC .............. *G01V 3/08* (2013.01); *A47J 47/005* (2013.01); *G08B 7/06* (2013.01)

(58) Field of Classification Search
CPC ............ G01V 3/08; A47J 47/005; G08B 7/06
See application file for complete search history.

(56) References Cited

U.S. PATENT DOCUMENTS

| | | | | |
|---|---|---|---|---|
| 4,488,115 A | * | 12/1984 | Podhrasky | G01V 3/107 324/133 |
| 4,814,734 A | * | 3/1989 | Moran | G01V 3/10 29/605 |
| 6,211,672 B1 | * | 4/2001 | Bauman | G01V 3/15 324/226 |
| 6,215,293 B1 | * | 4/2001 | Yim | G01V 3/15 324/326 |
| 6,342,835 B1 | * | 1/2002 | Nelson-White | G01V 3/108 340/551 |
| 6,838,874 B1 | * | 1/2005 | Franklin | G01V 3/15 324/228 |
| 9,329,295 B1 | * | 5/2016 | Blake | G01V 3/15 |
| 9,637,309 B2 | * | 5/2017 | Starkey | B65F 1/1473 |
| 2004/0113781 A1 | * | 6/2004 | Stis | G01V 3/105 340/551 |
| 2010/0148983 A1 | * | 6/2010 | Huxley | H01R 13/7038 340/815.4 |

(Continued)

FOREIGN PATENT DOCUMENTS

CN 202912331 5/2013
WO 2001/058513 A1 8/2001

*Primary Examiner* — Joseph H Feild
*Assistant Examiner* — Rufus C Point
(74) *Attorney, Agent, or Firm* — Jimenez Law Firm; Jose W. Jimenez

(57) ABSTRACT

A mobile or transportable ammunition pellet or foreign object detection device is provided which includes a metal or other ammunition detector which uses a metal detection strip of the device. In a related embodiment, an LED platform for displaying various types of information is also provided as part of the detection device. In a related embodiment, the detection device includes an integrated scale and cutting board.

20 Claims, 4 Drawing Sheets

(56) References Cited

U.S. PATENT DOCUMENTS

| | | | |
|---|---|---|---|
| 2010/0196642 A1* | 8/2010 | Langer | B23P 11/00 |
| | | | 428/36.8 |
| 2014/0145819 A1* | 5/2014 | Wall | E05G 1/024 |
| | | | 340/5.2 |
| 2015/0028875 A1* | 1/2015 | Irie | G01V 3/10 |
| | | | 324/345 |

* cited by examiner

METAL AMMUNITION DETECTION DEVICE

CLAIM OF PRIORITY

This application claims priority to and the benefit of U.S. Provisional Application having Ser. No. 62/539,638 and filed on Aug. 1, 2017, entitled METAL AMMUNITION DETECTION DEVICE, the contents of which are incorporated by reference in its entirety.

FIELD OF THE INVENTION

The invention relates generally to a device to detect ammunition and buck shots.

BACKGROUND

Currently there are a number of solutions for the detection of metal shots, bird shots, and pellets for removal from fowl and small game. Some of these solutions attempt to utilize hand held metal detectors, but these solutions fail to meet the needs of the market because these devices are often unreliable. Other solutions attempt to forego tools to find shrapnel, but these solutions are similarly unable to meet the needs of the market because detecting shot or pellets by feeling the game is also unreliable. Still other solutions seek to hold the game to the light to look for shots, but these solutions also fail to meet market needs because the light cannot shine through thicker pieces of game to make the shot or pellets visible.

SUMMARY OF THE INVENTION

The various embodiments of the invention relate generally to a mobile ammunition or metal pellet detection device with an integrated scale and cutting board. It would be advantageous to have an apparatus that is a portable ammunition detection device. Furthermore, it would also be advantageous to have an apparatus that allows the hunter to weigh the game in the field as well as locate the ammunition or metal or non-metal (non-translucent) pellets (via a graphic interface) within the hunted game or animal so it can be easily and quickly removed.

Still further, it would be advantageous to have an apparatus, in a related embodiment, that provides a mobile solution for Emergency Services Providers such as EMT, Law Enforcement, and Firefighters to quickly locate bullets or shrapnel in the field and collect any data needed. Therefore, there currently exists a need in the market for an apparatus that is a water and impact resistant portable technological tool that allows hunters or users to weigh hunted game as well as locate ammunition within the game so it can be more easily removed in the field or at home and can be used for other applications where discovery of shrapnel or metal or other bulky, non-translucent objects is necessary.

The invention advantageously fills the aforementioned deficiencies by providing a mobile ammunition detection device with integrated scale and cutting board, which provides a more convenient tool to assist small game hunters when cleaning game.

In one example embodiment, the apparatus is equipped with a built-in rechargeable battery, 100v auxiliary port, and standard detachable plug. The apparatus has a metal detection strip as well as an LED lighting system that assists the hunter in locating any ammunition, pellets, or fragments in the game. In a related embodiment, the apparatus may also have a knife and tweezers that are included within the housing of the board to be used as tools for easier extraction of the ammunition or embedded object.

In one example embodiment, there is provided an ammunition detection device including a housing having a top surface and at least one handle operatively coupled to the housing. The detection device also includes a metal detection device located within the housing and underneath the top surface and an alert selection switch device disposed on the housing and operatively coupled with the metal detection device to provide a user with an alert that a metal object has been detected. The detection device further includes a power actuator switch device operatively coupled to the metal detection device and the alert selection switch, the power actuator switch configured to engage a power source. In one related example embodiment, the housing includes a storage compartment for storing hunting tool accessories. In yet another related embodiment, the metal detector device within the housing is substituted with or is in addition to a high powered light source to facilitate ammunition detection through the top surface of the housing where the ammunition or the object to be detected is not metallic.

In another example embodiment, there is provided an ammunition or object detection device that includes a housing having a top surface and a metal detection device located within the housing and underneath the top surface. The detection device also includes an alert selection switch device disposed on the housing and operatively coupled with the metal detection device to provide a user with an alert that a metal object has been detected as well as a power source coupling member operatively coupled to the metal detection device and the alert selection switch, wherein the power source coupling member is configured to engage a power source. In a related embodiment, and disposed over the top surface of the housing, there is included one of a flat sheet cover, a flat sheet translucent or transparent cover, a flat sheet slide-in cover, a box-like translucent or transparent cover, and a flexible enveloping cover. In yet another related embodiment, the alert selection switch provides for multiple alerts including any one or more of a light alert, an auditory alert, and a vibratory alert. In yet another example embodiment, the device is equipped with an embedded cup/pocket or pull-out pocket or drawer for depositing shot pellets that have been pulled out. The pull-out drawer can include a screen or mesh for ease of cleaning after disposing of the pellets.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
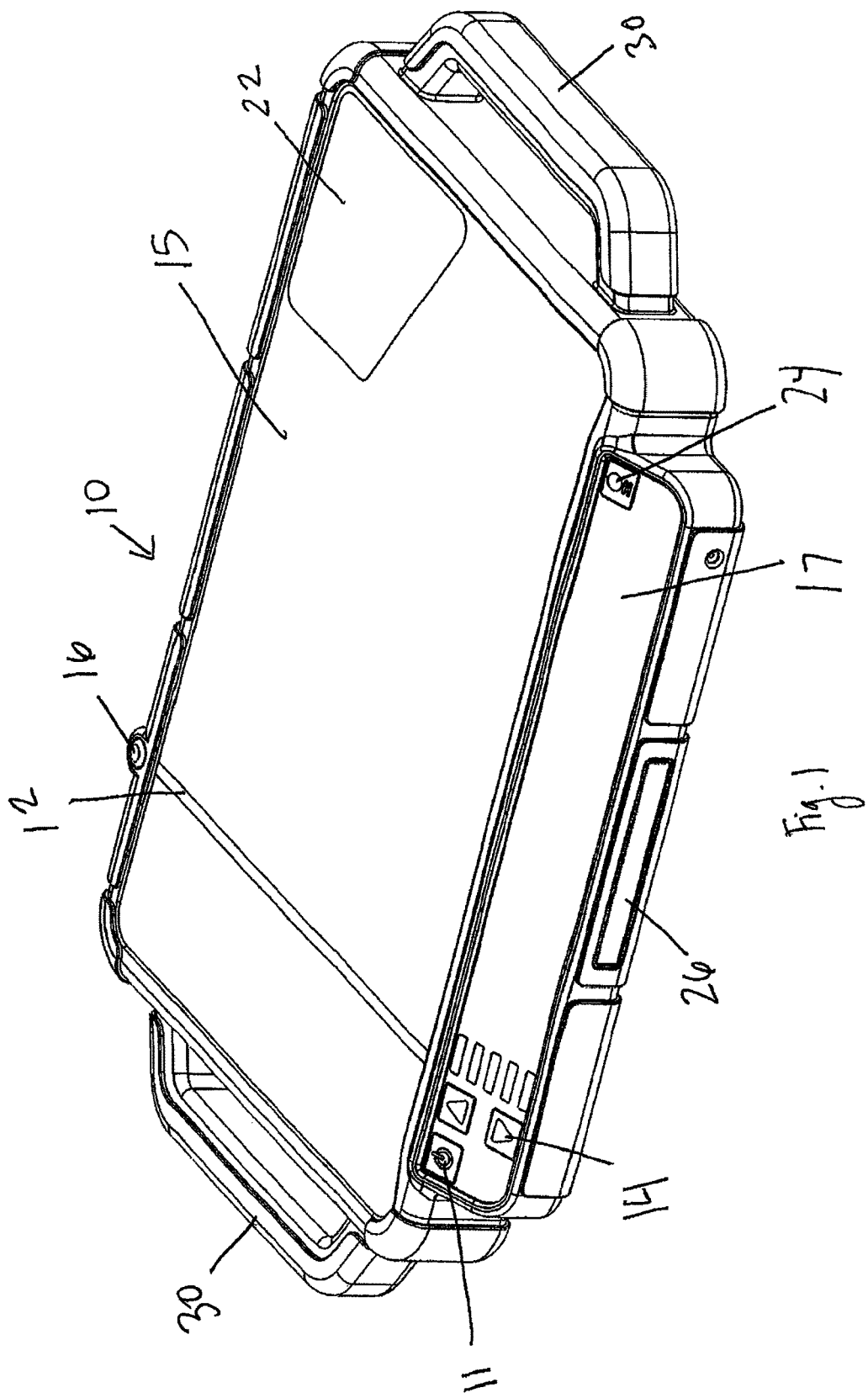
FIG. 1 illustrates an example embodiment of a mobile ammunition or embedded object detection device according to the invention.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the invention are directed to a mobile ammunition or embedded object detection device with an integrated scale and cutting board. In a related embodiment, the board is removable for cleaning from the main unit. The device may also include a drawer for storing small instruments such as tweezers and a compartment for storing a knife, which may be conveniently used for removing the ammunition from the game. In a related embodiment, the knife compartment may include a separate sheath that is removable from the portable frame for cleaning.

Referring to the figures, FIGS. 1-4 illustrate an example embodiment of a mobile ammunition or embedded object detection device 10. Mobile ammunition detection device 10 includes a power button 11 that turns the device on and off and a top surface 15 of a housing 10A of device 10 located on a top of mobile ammunition detection device 10 that may optionally be used as a cutting board. In a related embodiment, housing 10A includes a cover that overlays top surface 15 to serve as a cutting board (which can be a flat sheet or a box-like cover that fits over housing 10A). In this example embodiment, mobile ammunition detection device 10 also has handles 30 on each side (optional) of the device for easy transportation.

In use, ammunition or shot pellets are detected by passing the game portion (such as a duck breast or a pheasant breast or meat) over a metal detection strip 12. The intensity of a magnetic field of detection strip 12 may be adjusted with the up and down detection buttons 14. Metal indicator light 16 illuminates when detection strip 12 detects metal or ammunition.

In an example embodiment, mobile ammunition detection device 10 includes an integrated scale within surface 15 (or underneath surface 15). When the device is on and an item is placed on surface 15, the weight of the item is displayed on a screen 17. Screen 17 may also display the battery life.

For thinner pieces of game, in this example embodiment, ammunition may be detected using an LED platform 22, which includes an LED power button 24 turns the lights in LED platform 22 on and off. When LED platform 22 is on, a thinner piece of game (such as a bird or fish if you need to find a hook) may be placed on LED platform 22 and the game will be illuminated so that ammunition or object contained with the game can be identified. In a related embodiment, light 16 or platform 22 is lit and used for viewing of embedded objects that are not metal, such as plastic pellets, pebbles, stones or wood.

Figure 2:
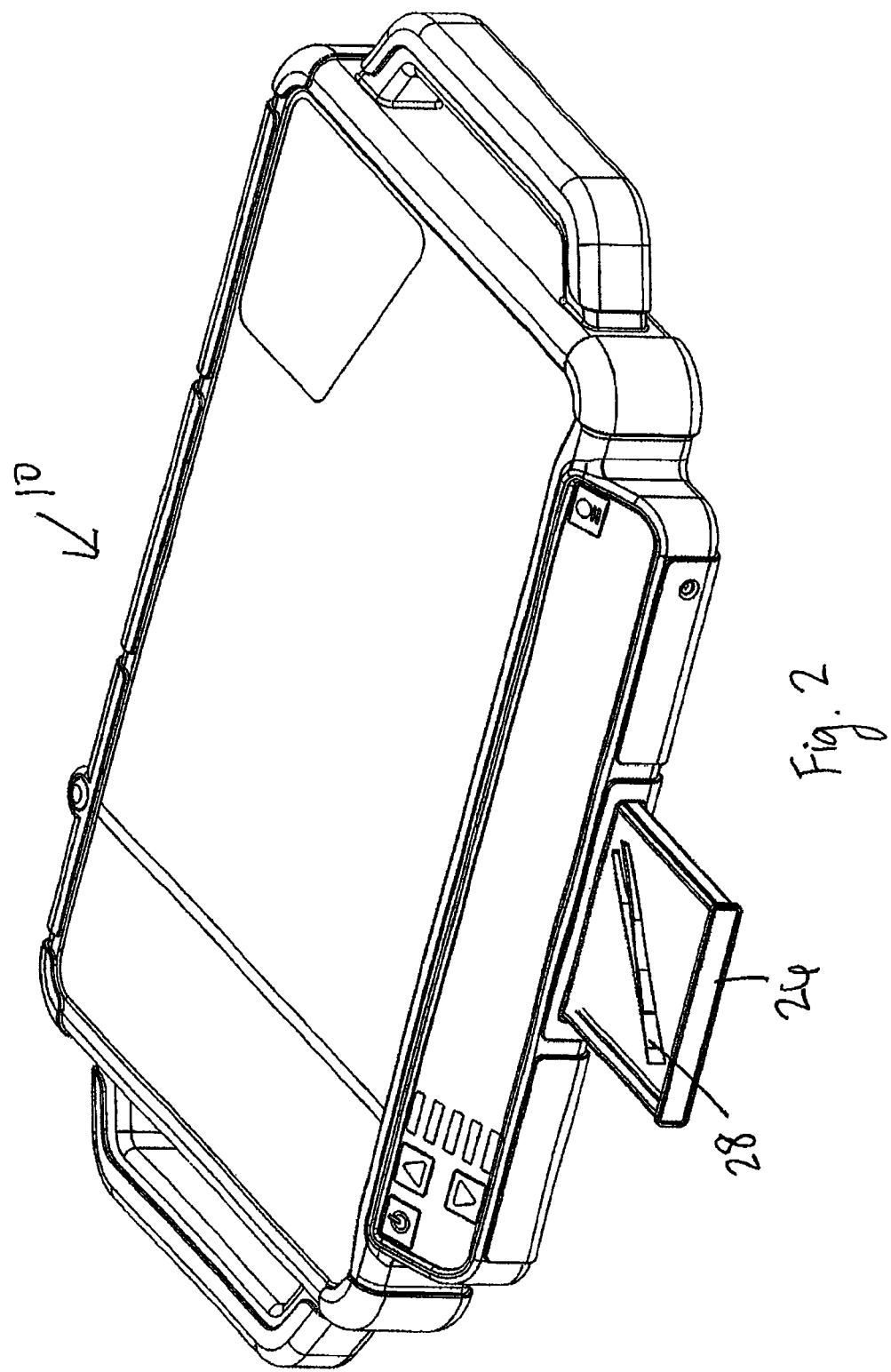
FIG. 2 illustrates a perspective of the detection device equipped with a set of tweezers.
Figure 3:
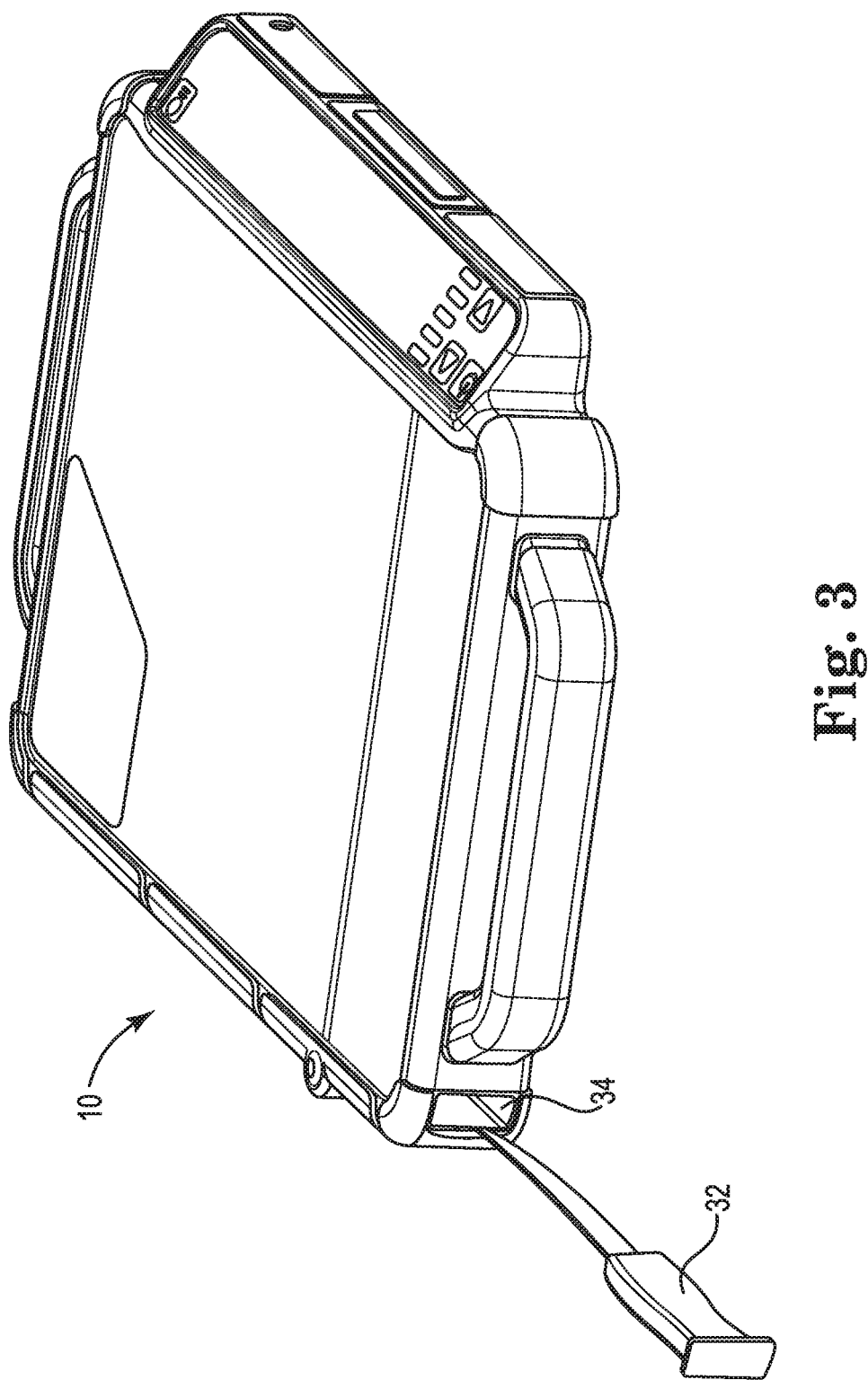
FIG. 3 illustrates a perspective view of the detection device equipped with a fillet knife.

In this example embodiment, mobile ammunition detection device 10 includes a drawer 26 that is used to store small items. Drawer 26 is capable of locking while closed through a variety of methods such as a hinge lock, snap-fit, or other frictional engagement. FIG. 2 illustrates mobile ammunition detection device 10 with drawer 26 in an open position. In an example embodiment, tweezers 28 are included to be used for removal of ammunition. In this example embodiment, mobile ammunition detection device 10 also includes storage compartment 34 for storing a fillet knife 32. FIG. 3 illustrates mobile ammunition detection device 10 with fillet knife 32 extended from a storage compartment 34. Storage compartment 34 is capable of locking while closed through a variety of methods such as a hinge lock, snap-fit, or other frictional engagement.

The various embodiments of mobile ammunition detection device 10 may be made from a variety of materials, including but not limited to, rubber, plastic, metal, or other materials known in the art.

In an example embodiment, mobile ammunition detection device 10 may be powered through standard 9-V batteries, 12-V charge/cord from a 12V DC battery, rechargeable batteries, or have a standard electrical power cord. In a related embodiment, mobile ammunition detection device 10 may include a USB port, solar recharging capabilities, and Wi-Fi or other wireless communication capabilities.

Figure 4:
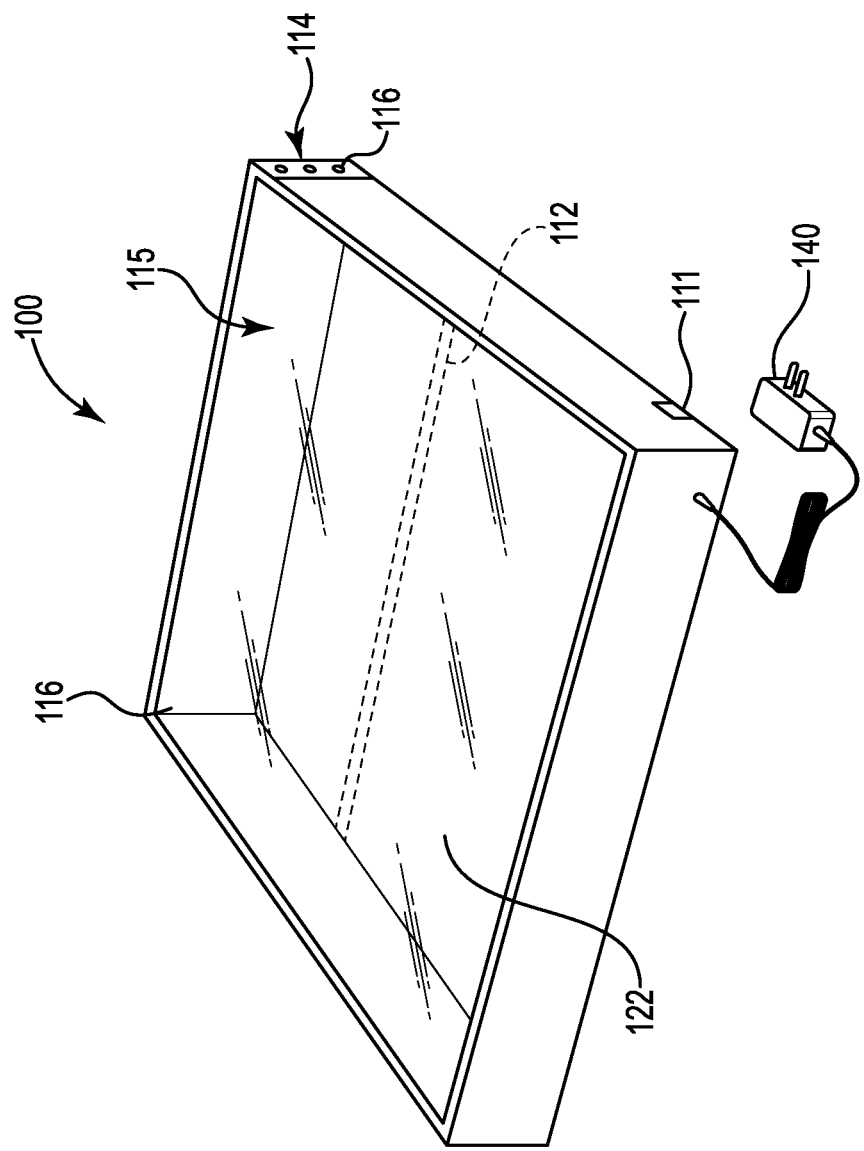
FIG. 4 illustrates another example embodiment of an ammunition or embedded object detection device.

An alternative example embodiment of the ammunition detection device is shown in FIG. 4. FIG. 4 illustrates ammunition detection device 100 with a standard electrical power cord 140. Detection buttons 114 may include a switch for a light alert, an auditory alert, or both when ammunition is detected. When ammunition is detected, indicator lights 116 illuminate, for example, in red. Surface 115 includes LED platform 122 that illuminates when power button 111 is turned on. Detection strip 112 is located in the center of ammunition detection device 100 underneath surface 115.

In an embodiment, ammunition detection device 100 may be sized for use in a kitchen. Exemplary dimensions may include 20 inches wide, 14 inches long, and 2-3 inches thick. Alternatively, dimensions may be smaller or larger depending on the needs of the user, for example, small game may require a smaller device 100, while large game may require a larger device 100. Ammunition detection devices 10 and 100 may also include a magnetic portion (not shown) of surface 16 or 116 so as to keep ammunition contained. In a related embodiment, the ammunition detection device is also configurable for detection of non-metallic objects, for instance by using a strong light source (or different lights in the spectrum) that projects light through the game or food item placed on the top surface of the detection device, making it easier to detect the foreign object.

The following patents/publications are incorporated by reference in their entireties: Pat. Nos. WO2001/058513 and CN202912331

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A mobile ammunition detection device kit configured for locating foreign objects within a game or food item placed thereon comprising:

a housing having a top surface and at least one handle operatively coupled to the housing, wherein the at least one handle is located laterally from and parallel with the top surface of the housing;

a metal detection device located within the housing and underneath the top surface configured to locate metal objects embedded within the game or food item that is located on the top surface;

a light emitting device located within the housing and under the top surface, wherein the light emitting device is configured to allow a user to visually locate non-translucent objects embedded within the food item that is located on the top surface;

a flat sheet translucent or transparent cover configured to be disposed over the top surface of the housing;

an alert selection switch device disposed on the housing and operatively coupled with the metal detection device to provide a user with an alert that a metal object has been detected; and a power actuator switch device operatively coupled to the metal detection device and the alert selection switch, the power actuator switch configured to engage a power source.

2. The detection device of claim 1 wherein the alert selection switch provides for multiple alerts including any one or more of a light alert, an auditory alert, and a vibratory alert.

3. The detection device of claim 1 further comprising a power source operatively coupled to the power actuator switch device.

4. The detection device of claim 3 wherein the light emitting device includes an LED platform accessory that illuminates when the power source is engaged.

5. The detection device of claim 1 further comprising a compartment in the housing for storing metal hunting accessories.

6. The detection device of claim 1 wherein the power source includes a removable battery that is located within the housing.

7. The detection device of claim 1 further comprising at least one of a box-like translucent or transparent cover or a flexible enveloping cover configured to be disposed over the top surface of the housing.

8. A mobile embedded object detection device configured for locating foreign objects within a game or food item located thereon comprising:

a housing having a top surface cover, wherein the top surface cover is configured from one of a translucent or transparent material;

a metal detection device located within the housing and underneath the top surface cover configured to locate metal objects embedded within the game or food item that is located on the top surface cover;

a light emitting device located within the housing and under the top surface cover, wherein the light emitting device is configured to allow a user to visually locate non-translucent objects embedded within the game or food item that is located on the top surface;

an alert selection switch device disposed on the housing and operatively coupled with the metal detection device to provide a user with an alert that a metal object has been detected;

a power source coupling member operatively coupled to the metal detection device and the alert selection switch, wherein the power source coupling member is configured to engage a power source; and at least one of a box-like translucent or transparent cover or a flexible enveloping cover configured to be disposed over the housing.

9. The detection device of claim 8 further comprising, and disposed over the top surface cover, one of a flat sheet cover, a flat sheet translucent or transparent cover, or a flat sheet slide-in cover.

10. The detection device of claim 8 wherein the alert selection switch provides for multiple alerts including any one or more of a light alert, an auditory alert, and a vibratory alert.

11. The detection device of claim 8 further comprising a weight scale device integrated with the housing and configured for weighing the game or food item.

12. The detection device of claim 11 further comprising a display screen integrated with the housing configured to display parameters or data selected from the group consisting of a weight, battery life, time of day and date.

13. The detection device of claim 1 further comprising a weight scale device integrated with the housing and configured for weighing the game or food item.

14. The detection device of claim 13 further comprising a display screen integrated with the housing configured to display parameters or data selected from the group consisting of a weight, battery life, time of day and date.

15. A mobile ammunition detection device kit configured for locating foreign objects within an item placed thereon comprising:

a housing having a top surface;

a light emitting device located within the housing and under the top surface, wherein the light emitting device is configured to allow a user to visually locate foreign objects embedded within the item that is located on the top surface;

a flat sheet translucent or transparent cover configured to be disposed over the top surface; and a power actuator switch device operatively coupled to the light emitting device and configured to engage a power source.

16. The detection device of claim 15 further comprising and disposed over the top surface at least one of a box-like translucent or transparent cover or a flexible enveloping cover.

17. The detection device of claim 15 further comprising a weight scale device integrated with the housing and configured for weighing the item located on the top surface.

18. The detection device of claim 15 further comprising at least one handle operatively coupled to the housing, wherein the at least one handle is located laterally from and parallel with the top surface of the housing.

19. The detection device of claim 15 further comprising an alert selection switch device disposed on the housing and operatively coupled with the light emitting device to provide a user with an alert that an object has been detected.

20. The detection device of claim 15 further comprising a compartment in the housing for storing a knife.

* * * * *